US012794001B2

(12) United States Patent
Kim et al.

(10) Patent No.: US 12,794,001 B2
(45) Date of Patent: Nov. 10, 2026

(54) UNIT CELL ALIGNING DEVICE AND METHOD

(71) Applicant: LG Energy Solution, Ltd., Seoul (KR)

(72) Inventors: Yoong Kim, Daejeon (KR); Yeong Tae Gwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 378 days.

(21) Appl. No.: 18/580,391

(22) PCT Filed: Jul. 19, 2022

(86) PCT No.: PCT/KR2022/010488
§ 371 (c)(1),
(2) Date: Jan. 18, 2024

(87) PCT Pub. No.: WO2023/013922
PCT Pub. Date: Feb. 9, 2023

(65) Prior Publication Data

US 2024/0347752 A1 Oct. 17, 2024

(30) Foreign Application Priority Data

Aug. 3, 2021 (KR) ........................ 10-2021-0101704

(51) Int. Cl.
*H01M 10/04* (2006.01)

(52) U.S. Cl.
CPC ............................... *H01M 10/0404* (2013.01)

(58) Field of Classification Search
CPC .......... H01M 10/0404; H01M 10/0459; G01B 11/002; G01B 11/272
See application file for complete search history.

(56) References Cited

U.S. PATENT DOCUMENTS

| | | | |
|---|---|---|---|
| 2013/0240323 | A1 | 9/2013 | Min et al. |
| 2020/0212494 | A1 | 7/2020 | Kim et al. |
| 2021/0050626 | A1 | 2/2021 | Kim et al. |
| 2022/0149422 | A1 | 5/2022 | Shin |
| 2022/0393222 | A1 | 12/2022 | Kim et al. |

FOREIGN PATENT DOCUMENTS

| | | | |
|---|---|---|---|
| CN | 111566862 | A | 8/2020 |
| EP | 4117081 | A1 | 1/2023 |
| KR | 20080010005 | A | 1/2008 |

(Continued)

OTHER PUBLICATIONS

International Search Report for Application No. PCT/KR2022/010488 mailed Nov. 2, 2022. 3 pages.

(Continued)

*Primary Examiner* — Sarah A. Slifka
(74) *Attorney, Agent, or Firm* — Lerner David LLP

(57) ABSTRACT

The present invention provides a unit cell aligning device, including a first conveying unit which conveys a unit cell including an electrode and a separation membrane in a first direction; a first vision unit that measures a twisted angle of the electrode; a gripper that grips and moves the unit cell; and a control unit that controls the gripper, wherein the control unit adjusts an angle of the gripper on the basis of the twisted angle of the electrode measured by the first vision unit before the gripper grips the unit cell, and returns the gripper so that the angle of the gripper becomes an angle before adjustment after the gripper grips the unit cell.

14 Claims, 3 Drawing Sheets

(56) References Cited

FOREIGN PATENT DOCUMENTS

| | | | |
|---|---|---|---|
| KR | 20120060705 | A | 6/2012 |
| KR | 20120137143 | A | 12/2012 |
| KR | 20130000617 | A | 1/2013 |
| KR | 20160051347 | A | 5/2016 |
| KR | 20190083129 | A | 7/2019 |
| KR | 20190091745 | A | 8/2019 |
| KR | 20190091746 | A | 8/2019 |
| KR | 20190092019 | A | 8/2019 |
| KR | 20190113022 | A | 10/2019 |
| KR | 102146945 | B1 | 8/2020 |
| KR | 102236697 | B1 | 4/2021 |
| KR | 20210055186 | A | 5/2021 |
| KR | 102287768 | B1 | 8/2021 |
| WO | 2020159295 | A1 | 8/2020 |
| WO | 2021096183 | A1 | 5/2021 |

OTHER PUBLICATIONS

Extended European Search Report including Written Opinion for Application No. 22853301.4 dated Sep. 24, 2024. 8 pgs.

Search Report dated Aug. 20, 2026 from the Office Action for Chinese Application No. 202280047169.5, issued Aug. 25, 2026. 2 pgs.

【Figure 1】
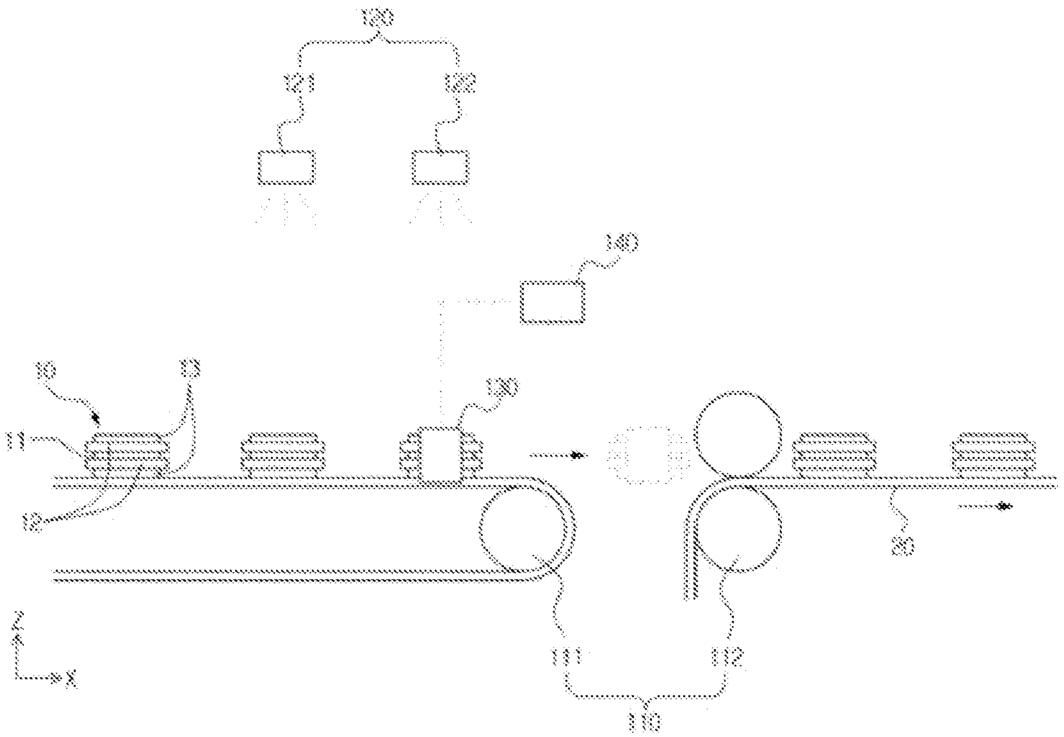

【Figure 2】
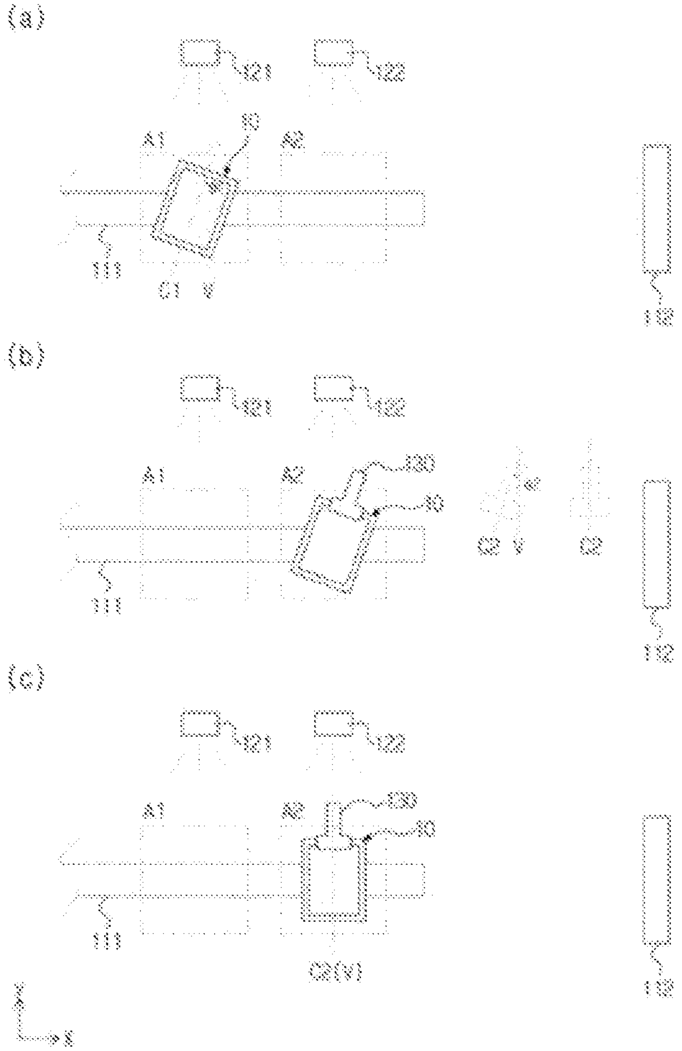

【Figure 3】
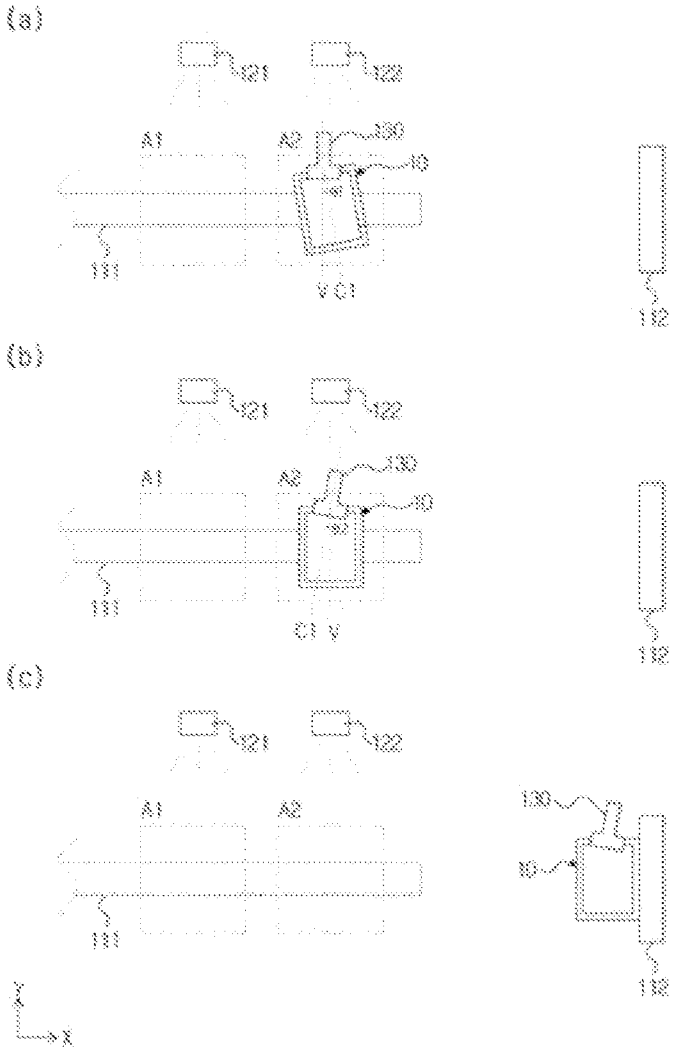

UNIT CELL ALIGNING DEVICE AND METHOD

CROSS-REFERENCE TO RELATED APPLICATIONS

The present application is a national stage entry under 35 U.S.C. § 371 of International Application No. PCT/KR2022/010488, filed on Jul. 19, 2022, which claims of priority to Korean Patent Application No. 10-2021-0101704, filed on Aug. 3, 2021, the disclosures of which are hereby incorporated herein by reference in their entireties.

TECHNICAL FIELD

The present invention relates to a unit cell aligning device and method.

BACKGROUND ART

With increasing technological development and demand for mobile devices, a rechargeable secondary battery is widely used as energy sources for various mobile devices. In addition, the secondary battery is attracting attention as an energy source for an electric vehicle, a hybrid vehicle and the like, which are proposed as a solution to air pollution caused by existing gasoline and diesel vehicles.

The secondary battery is classified into a coin-shaped battery, a cylindrical battery, a rectangular battery, and a pouch-shaped battery according to the shape of the battery case in which the electrode assembly is incorporated. In general, an electrode assembly incorporated in the battery case is classified into a jelly-roll type in which a separation membrane is interposed and wound up between an anode and a cathode, a stack type in which a plurality of unit cells with the separation membrane interposed between the anode and the cathode are stacked, and a stack/folding type in which the unit cells are wound with a separation membrane.

Among them, the stack/folding type can be manufactured by conveying the unit cells including the electrodes and the separation membrane, seating them on the separation membrane, and winding it with the separation membrane. At this time, if the electrodes are distorted during transportation of the unit cells, the unit cells are misaligned, and problems such as overhang defects may occur.

PRIOR ART DOCUMENT

Patent Document

Korean Laid-open Patent Publication No. 10-2021-0055186

DISCLOSURE

Technical Problem

An object of the present invention is to improve the alignment accuracy of unit cells seated on a separation membrane.

Another object of the present invention is to improve overhang defects.

Another object of the present invention is to improve folding gap defects.

Technical Solution

An embodiment of the present invention provides a unit cell alignment device, including: a first conveying unit which conveys a unit cell including an electrode and a separation membrane in a first direction; a first vision unit that measures a twisted angle of the electrode; a gripper that grips and moves the unit cell; and a control unit that controls the gripper, in which the control unit adjusts an angle of the gripper on the basis of the twisted angle of the electrode measured by the first vision unit before the gripper grips the unit cell, and returns the gripper so that the angle of the gripper becomes an angle before adjustment after the gripper grips the unit cell, the twisted angle of the electrode is an angle formed by a virtual line in a second direction perpendicular to the first direction on a plane and a central axis of the electrode, and the angle of the gripper is an angle formed between the virtual line in the second direction and a central axis of the gripper.

An embodiment of the invention provides a unit cell aligning method, including: a step of conveying a unit cell including an electrode and a separation membrane in a first direction; a step of measuring a twisted angle of the electrode; a step of adjusting an angle of the gripper on the basis of the measured twisted angle of the electrode; a step of gripping the unit cell with the gripper having the adjusted angle; and a step of returning the gripper so that the angle of the gripper that grips the unit cell becomes an angle before adjustment, in which the twisted angle of the electrode is an angle formed by a virtual line in a second direction perpendicular to the first direction on a plane and a central axis of the electrode, and the angle of the gripper is an angle formed between the virtual line in the second direction and a central axis of the gripper.

Advantageous Effects

One of the effects of the present invention is to improve the alignment accuracy of the unit cells seated on the separation membrane.

Another effect of the present invention is to improve overhang defects.

Another effect of the present invention is to improve folding gap defects.

DESCRIPTION OF DRAWINGS

FIG. 1 is a side view of a unit cell aligning device according to an embodiment of the present invention.

FIG. 2 is a plan view for explaining alignment of unit cells according to an embodiment of the present invention.

FIG. 3 is a plan view for explaining further alignment of unit cells according to an embodiment of the present invention.

BEST MODE

Embodiments of the present invention will now be described in detail with reference to the accompanying drawings. For convenience of explanation, all or part of each configuration may be expressed exaggeratedly in the drawings.

Furthermore, the present invention is not limited to the accompanying drawings or the contents described in this specification, and it is obvious to those skilled in the art that the present invention can be embodied in various forms without departing from the technical spirit of the present invention.

FIG. 1 is a side view of a unit cell aligning device according to an embodiment of the present invention.

A unit cell 10 aligning device according to an embodiment of the present invention includes a conveying unit 110, a vision unit 120, a gripper 130 and a control unit 140.

The unit cell 10 includes electrodes 11 and 13 and a separation membrane 12. Specifically, the unit cell 10 may have a structure in which the electrodes 11 and 13 and the separation membrane 12 are alternately laminated. According to an embodiment of the present invention, the unit cell 10 may include the first electrode 11, the separation membrane 12 stacked on both sides of the first electrode 11, and the second electrode 13 stacked on each separation membrane 12 stacked on both sides of the first electrode 11, but the structure of the unit cell 10 is not limited thereto.

One of the first electrode 11 and the second electrode 13 may be an anode and the other may be a cathode. For example, the first electrode 11 may be the anode and the second electrode 13 may be the cathode. A cross-sectional area of the first electrode 11 which is the anode may be larger than the cross-sectional area of the second electrode 13 which is the cathode. Here, the cross-sectional area means a cross-sectional area on a plane defined by a first direction x and a second direction y. Each of the first electrode 11 and the second electrode 13 may have a structure in which a tab is formed at one end portion, but the tab of the electrode is omitted in the drawings.

The separation membrane 12 is disposed between the electrodes 11 and 13. The cross-sectional area of the separation membrane 12 may be larger than the cross-sectional areas of the electrodes 11 and 13. As described above, the cross-sectional area of the first electrode 11 which is the anode may be larger than the cross-sectional area of the second electrode 13 which is the cathode. In this case, the cross-sectional area may decrease in order of the separation membrane 12, the first electrode 11 and the second electrode 13.

The conveying unit 110 conveys the unit cells 10. The conveying unit 110 may include a first conveying unit 111 and a second conveying unit 112.

The first conveying unit 111 conveys the unit cell 10 including the electrodes 11 and 13 and the separation membrane 12 in the first direction x. The first conveying unit 111 can continuously transport a plurality of unit cells 10 spaced apart from each other by a predetermined interval. The first conveying unit 111 may be a conveyor belt.

As will be described later, the first conveying unit 111 may have a first area A1 that is an area in which the electrodes 11 and 13 are measured by a first vision unit 122, and a second area A2 that is an area in which the electrodes 11 and 13 are griped by a gripper 130 and measured by the second vision unit 122.

The second conveying unit 112 conveys the separation membrane 20 and the unit cells 10 disposed on the separation membrane 20. At this time, the unit cell 10 is supplied to the second conveying unit 112 by the gripper 130 to be described later and can be seated on the separation membrane 20. Therefore, the stack/folding type electrode assembly can be formed by winding the separation membrane 20 with the unit cells 10 seated thereon in a subsequent process.

The second conveying unit 112 may be a pair of rollers. Accordingly, the unit cell 10 can be loaded between the pair of rollers by the gripper 130 and pressed together with the separation membrane 20.

The vision unit 120 can measure the positional information of the electrodes 11 and 13, specifically measure twisted angles of the electrodes 11 and 13. However, the vision unit 120 can also measure other types of positional information such as the positions of the electrodes 11 and 13 and the alignment state between the electrodes 11 and 13, and can measure the positional information of the separation membrane 12 depending on the design. Information measured by the vision unit 120 can be conveyed to the control unit 140.

The vision unit 120 includes the first vision unit 121 and the second vision unit 122. Each of the first vision unit 121 and the second vision unit 122 can measure the twisted angle θ1 of the electrodes 11 and 13 in different areas. Each of the first vision unit 121 and the second vision unit 122 can include a vision device, which can be a camera, X-ray, or the like.

The gripper 130 can serve to grip and move the unit cell 10. Specifically, the gripper 130 can grip the unit cell 10 and supply the gripped unit cell 10 to the second conveying unit 112. The gripper 130 can grip one end or both ends of the unit cell 10. The gripper 130 includes a body and an arm, and the arm can grip the unit cell 10 and move it while being fixed.

The control unit 140 controls the gripper 130. The control unit 140 can control a moving distance, a moving speed, an angle, and the like of the gripper 130. At this time, the control unit 140 can control the gripper 130 on the basis of information measured by the vision unit 120.

DETAILED DESCRIPTION OF THE INVENTION

Hereinafter, the vision unit 120, the gripper 130 and the control unit 140 of the unit cell aligning device according to an embodiment of the present invention will be described in more detail with reference to FIGS. 2 and 3.

FIG. 2 is a plan view for explaining alignment of a unit cell according to an embodiment of the present invention.

The first conveying unit 111 has the first area A1 and the second area A2 adjacent to the first area A1. The unit cell 10 is conveyed along the first direction x, and the unit cell 10 sequentially passes through the first area A1 and the second area A2 accordingly. The first vision unit 121 is disposed on the first area A1 of the conveying unit 111, and the second vision unit 122 is disposed on the second area A2 of the conveying unit 111. In other words, the first area A1 is a first measurement area for measuring the unit cell 10 with the first vision unit 121, and the second area A2 is a second measurement area for measuring the unit cell 10 that has passed the first area A1 with the second vision unit 122. At this time, the unit cell 10 stops for a certain period of time in the first area A1 while being conveyed to the first conveying unit 111 and is measured by the first vision unit 121, and is conveyed again, stops for a certain period of time in the second area A2 and can be measured with the vision unit 122. Further, the second area A2 may be an area in which the unit cell 10 is gripped by the gripper 130, as will be described later. On the other hand, the first area A1 and the second area A2 are areas introduced for convenience of explanation, and may not have boundaries that is visually confirmed with each other.

On the other hand, in FIGS. 2 and 3, although each of the first vision unit 121 and the second vision unit 122 may be seen to be disposed on the second direction y of each of the first area A1 and the second area A2 of the first conveying unit 110, this is only for the purpose of helping understanding of the explanation, and each of the first vision unit 121 and the second vision unit 122 is disposed on a third direction z of each of the first area A1 and the second area A2 of the first conveying unit 110.

Further, as described above, the cross-sectional area of the separation membrane 12 may be larger than the cross-sectional areas of the electrodes 11 and 13, and the unit cell 10 is shown to have a structure in which the separation membrane 12 protrudes outside the outermost electrode 13 in the drawing.

Referring to FIG. 2(*a*), the first vision unit 121 measures the twisted angle θ1 of the electrodes 11 and 13 in the first area A1 of the first conveying unit 111.

In this specification, the twisted angle θ1 of the electrodes 11 and 13 is an angle that is formed by a virtual line V in the second direction y perpendicular to the first direction x on the plane and a central axis C1 of the electrodes 11 and 13. The central axis C1 of the electrodes 11 and 13 is a central axis in the second direction y when the electrodes 11 and 13 are not twisted and are ideally aligned. However, the central axis C1 of the misaligned electrodes 11 and 13 may not be directed in the second direction y.

The first vision unit 121 measures the twisted angle θ1 of at least one of the first electrode 11 and the second electrode 13. The first vision unit 121 may measure the twisted angle θ1 of the first electrode 11. The first vision unit 121 can measure the twisted angle θ1 of the first electrode 11 disposed inside the unit cell 10 instead of the second electrode 13, which is the outermost electrode. Accordingly, the unit cells 10 can be aligned on the basis of the first electrode 11. As described above, the first electrode 11 may be a an anode having a larger cross-sectional area than that of the second electrode 13, and thus overhang defect can be improved, by aligning the unit cells 10 on the basis of the first electrode 11 which is a cathode. However, the embodiment is not limited thereto, and the first vision unit 121 may measure the twisted angle of the second electrode 13 or measure the twisted angles of each of the first electrode 11 and the second electrode 13.

Referring to FIG. 2(*b*), the unit cell 10 is conveyed to the second area A2 of the first conveying unit 111, and the gripper 130 also moves to the second area A2 of the first conveying unit 111 to grip the unit cell 10.

At this time, the control unit 140 adjusts an angle θ2 of the gripper 130 on the basis of the twisted angle θ1 of the electrodes 11 and 13 measured by the first vision unit 121 before the gripper 130 grips the unit cell 10. Specifically, the control unit 140 adjusts the angle θ2 of the gripper 130, by rotating the gripper 130 by the twisted angle θ1 of the electrodes 11 and 13. Therefore, the central axis C2 of the gripper 130 after adjustment is parallel to the central axis C1 of the electrode 11 and 13. The angle θ2 of the gripper 130 may be adjusted before movement of the gripper 130, and may also be adjusted during movement or after movement.

In this specification, the angle θ2 of the gripper 130 is an angle that is formed by the virtual line V in the second direction y perpendicular to the first direction x on the plane and the central axis C2 of the gripper 130. The central axis C2 of the gripper 130 is a central axis in the second direction y when the gripper 130 is in an unadjusted and aligned state. However, after adjustment as shown in the drawing, the central axis C2 of the gripper 130 may not be directed in the second direction y.

Referring to FIG. 2(*c*), after the gripper 130 grips the unit cell 10, the control unit 140 returns the gripper 130 so that the angle θ2 of the gripper 130 becomes the angle before adjustment. In other words, after the gripper 130 grips the unit cell 10, the control unit 140 rotates the gripper 130 again by the angle at which the gripper 130 rotates before gripping the unit cell 10 to return the gripper 130. Therefore, the central axis C2 of the gripper 130 is directed to the second direction y again, and becomes parallel to any virtual line V in the second direction y. The returned gripper 130 is still located in the second area A2 of the conveying unit 111.

As described above, the unit cell aligning device according to an embodiment of the present invention grips the unit cell 10 in a state in which the electrodes 11 and 13 of the unit cell 10 are rotated by the twisted angle θ1, and returns the gripper 130 that grips the unit cell 10, thereby performing a primary alignment for the unit cell 10. However, even after such alignment, misalignment of the unit cells 10 may still occur. Therefore, according to an embodiment of the present invention, further alignment of unit cells 10 may be performed as described below.

FIG. 3 is a plan view for explaining further alignment of unit cells according to an embodiment of the present invention.

Referring to FIG. 3(*a*), the second vision unit 122 further measures the twisted angle θ1 of the electrodes 11 and 13, while being gripped by the gripper 130, after the gripper 130 returns in the second area A2 of the first conveying unit 111. Ideally, the reason is that the alignment of the unit cells 10 needs to be aligned by the primary correction described in FIG. 2, but alignment errors of the unit cells 10 may still occur due to errors in measurement or adjustment.

The second vision unit 122 also measures the twisted angle θ1 of at least one of the first electrode 11 and the second electrode 13. It may be desirable for the second vision unit 122 to measure the twisted angle of the same electrode as the electrode measured by the first vision unit 121 in view of further alignment. For example, the second vision unit 122 may measure the twisted angle θ1 of the first electrode 11 which is the anode, in the same way as the first vision unit 121. However, the embodiment is not limited thereto, and the second vision unit 122 may measure the twisted angle of the second electrode 13 together with the first vision unit 121, or measure the twisted angle of each of the first electrode 11 and the second electrode 13. If necessary, the twisted angle of an electrode different from the electrode measured by the first vision unit 121 can also be measured.

Referring to FIG. 3(*b*), the control unit 140 further adjusts the angle θ2 of the returned gripper 130 on the basis of the twisted angle θ1 of the electrodes 11 and 13 measured by the second vision unit 122. Specifically, the control unit 140 further adjusts the angle θ2 of the gripper 130, by rotating the gripper 130 by the twisted angle θ1 of the electrodes 11 and 13 after the gripper 130 returns. Therefore, the central axis C2 of the gripper 130 may not be directed to the second direction y again. The angle θ2 of the gripper 130 may be further adjusted in the second area A2 of the first conveying unit 111, may be adjusted during movement of the gripper 130 to the second conveying unit 112, or may be adjusted after movement.

Referring to FIG. 3(*c*), the control unit 140 can further control the gripper 130 to maintain the adjusted angle and supply the unit cell 10 to the second conveying unit 112. That is, the control unit 140 can control the gripper 130 gripping the unit cell 10 to maintain the adjusted angle and move the unit cell 10 to the second conveying unit 112 in the second area A2 of the first conveying unit 111. Therefore, the unit cells 10 can be supplied to the second carrier 112 with improved alignment.

As described above, according to an embodiment of the present invention, the alignment of the unit cell 10 can be corrected by controlling the angle θ2 of the gripper 130 that grips the unit cell 10. Also, the alignment of the unit cells 10 can be further improved by performing two corrections before and after the unit cells 10 are gripped by the gripper 130. In addition, by providing the unit cells 10 in an aligned state, the alignment accuracy of the unit cells 10 seated on the separation membrane 20 can be improved, and folding gap defects can also be improved accordingly. In addition, by aligning the unit cells 10 on the basis of the first electrode 11 which is the anode, the overhang defect can be further improved.

A unit cell aligning method of the present invention includes a step of conveying the unit cell 10 including the electrodes 11 and 13 and the separation membrane 12 in the first direction x, a step of measuring the twisted angle θ1 of the electrodes 11 and 13, a step of adjusting the angle θ2 of the gripper 130 on the basis of the measured twisted angle θ1 of the electrodes 11 and 13, a step of gripping the unit cell 10 with the gripper 130 whose angle is adjusted, and a step of returning the gripper 130 so that the angle θ2 of the gripper 130 gripping the unit cell 10 becomes an angle before adjustment.

In addition, the unit cell aligning method of the present invention may further include a step of further measuring the twisted angle θ1 of the electrodes 11 and 13 after the gripper 130 is returned, and a step of further adjusting the angle θ2 of the gripper 130 on the basis of the additionally measured twisted angle of the electrodes 11 and 13.

On the other hand, the unit cell conveying step may include a first conveying step of conveying the electrodes 11 and 13 to the first area A1 in which the twisted angle θ1 of the electrodes 11 and 13 is measured, and a second conveying step of conveying the electrodes 11 and 13 to the second area A2 gripped by the gripper 130. At this time, the step of further measuring the twisted angle θ2 of the electrodes 11 and 13 can be performed in the second area A2.

Since other descriptions are applicable in substantially the same manner as the description of the unit cell aligning device according to an embodiment of the present invention, detailed descriptions thereof will be omitted.

Although the unit cell aligning device and method according to an embodiment of the present invention have been described above, the embodiments of the present invention are not limited to the above embodiments. Those skilled in the art will be able to modify and implement the present invention as appropriate with reference to the present specification and accompanying drawings without departing from the technical spirit of the present invention.

In this specification, the order of first, second, etc. is to distinguish components from each other and does not mean a priority between components or an absolute order. In some parts of the specification, a first component may be referred to as a second component in other parts of the specification.

In this specification, directions such as a first direction x, a second direction y, and a third direction z have been described on the basis of the drawings. Of course, the directions described herein can be described differently depending on the point of view.

In this description, the terms and expressions herein should be interpreted broadly and not in a restrictive sense. As used herein, the term "comprising" does not exclude the presence or addition of one or more other components in addition to the recited components. In this specification, the singular forms include the plural forms unless the context clearly dictates otherwise. Further, each embodiment is combinable with each other, and unless inconsistent, and contents described in specific embodiment is applicable to other embodiments unless inconsistent.

DESCRIPTION OF SYMBOLS

10: Unit cell,
11: First electrode,
12: Separation membrane,
13: Second electrode,
20: Separation membrane,
110: conveying unit,
111: First conveying unit,
112: Second conveying unit,
120: Vision unit,
121: First vision unit,
122: Second vision unit,
130: Gripper,
140: Control unit

The invention claimed is:

1. A unit cell aligning device, comprising:
a first conveying unit which is configured to convey a unit cell including an electrode and a separation membrane in a first direction;
a first vision unit that is configured to measure a twisted angle of the electrode;
a gripper that is configured to grip and move the unit cell; and
a control unit that is configured to control the gripper,
wherein the control unit is configured to adjust an angle of the gripper from an aligned angle to a twisted angle of the electrode measured by the first vision unit before the gripper grips the unit cell, and the control unit is configured to return the gripper so that the angle of the gripper becomes the aligned angle after the gripper grips the unit cell,
the twisted angle of the electrode is an angle formed by a central axis of the electrode relative to a virtual line in a second direction perpendicular to the first direction, and
the angle of the gripper is an angle formed by a central axis of the gripper relative to the virtual line in the second direction.

2. The unit cell aligning device according to claim 1, wherein the control unit is configured to rotate the gripper from the virtual line to the twisted angle of the electrode, before the gripper grips the unit cell.

3. The unit cell aligning device according to claim 1, wherein the electrode is a first electrode and the separation membrane is a first separation membrane, the unit cell further including a second separation membrane stacked on the first electrode opposite the first separation membrane, and two second electrodes stacked on the first and second separation membranes respectively, and the first vision unit is configured to measure the twisted angle of the first electrode.

4. The unit cell aligning device according to claim 3, wherein the first electrode is an anode, and the second electrode is a cathode.

5. The unit cell aligning device according to claim 1, further comprising: a second vision unit that is configured to measure a second twisted angle of the electrode after the gripper is returned, wherein the control unit is configured to further adjust the angle of the gripper from the aligned angle to the second twisted angle of the electrode measured by the second vision unit.

6. The unit cell aligning device according to claim 5, wherein the control unit is configured to rotate the gripper from the virtual line to the second twisted angle of the electrode after the gripper is returned.

7. The unit cell aligning device according to claim 5, wherein the electrode is a first electrode and the separation membrane is a first separation membrane, the unit cell further including, a second separation membrane stacked on the first electrode opposite the first separation membrane, and two second electrodes stacked on the first and second separation membranes respectively, and each of the first vision unit and the second vision unit are each configured to measure the twisted angle of the first electrode.

8. The unit cell aligning device according to claim 7, wherein the first electrode is an anode, and the second electrode is a cathode.

9. The unit cell aligning device according to claim 5, wherein the first vision unit is configured to measure the twisted angle of the electrode in a first area of the first conveying unit, the gripper is configured to grip the electrode in a second area of the first conveying unit adjacent to the first area, and the second vision unit is configured to measure the second twisted angle of the electrode in the second area of the first conveying unit.

10. The unit cell aligning device according to claim 5, wherein the separation membrane is a first separation membrane, the unit cell aligning device further comprising a second conveying unit that is configured to convey a second separation membrane, the unit cell being disposed on the second separation membrane, wherein the gripper is configured to move the unit cell and is configured to transfer the unit cell to the second conveying unit, and the control unit is further configured to control the gripper to maintain the aligned angle and to transfer the unit cell to the second conveying unit.

11. A unit cell aligning method, comprising:

conveying a unit cell including an electrode and a separation membrane in a first direction;

measuring a twisted angle of the electrode;

adjusting an angle of the gripper from an aligned angle to a measured twisted angle of the electrode;

gripping the unit cell with the gripper having the twisted angle; and returning the gripper so that the angle of the gripper that is gripping the unit cell becomes the aligned angle, wherein the twisted angle of the electrode is an angle formed by a central axis of the electrode relative to a virtual line in a second direction perpendicular to the first direction, and the angle of the gripper is an angle formed by a central axis of the gripper relative to the virtual line in the second direction.

12. The unit cell aligning method according to claim 11, further comprising:

measuring a second twisted angle of the electrode after the returning of the gripper; and adjusting the angle of the gripper after the returning from the aligned angle to the second twisted angle of the electrode.

13. The unit cell aligning method according to claim 12, wherein the conveying of the unit cell in the first direction includes a first conveying of the electrode to a first area in which the twisted angle of the electrode is measured, and a second conveying of the electrode to a second area in which the electrode is gripped by the gripper.

14. The unit cell aligning method according to claim 13, wherein the measuring of the second twisted angle of the electrode is performed in the second area.

* * * * *